US012748512B2

(12) United States Patent
Umemura et al.

(10) Patent No.: US 12,748,512 B2
(45) Date of Patent: Sep. 29, 2026

(54) INPUT APPARATUS AND OUTPUT DETECTION METHOD IN INPUT APPARATUS

(71) Applicant: ALPS ALPINE CO., LTD., Tokyo (JP)

(72) Inventors: Shunsuke Umemura, Miyagi (JP); Masanori Yabuki, Miyagi (JP); Hidemitsu Kondo, Miyagi (JP); Kuniaki Suzuki, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 19/205,488

(22) Filed: May 12, 2025

(65) Prior Publication Data

US 2025/0271972 A1 Aug. 28, 2025

Related U.S. Application Data

(63) Continuation of application No. PCT/JP2023/037491, filed on Oct. 17, 2023.

(30) Foreign Application Priority Data

Dec. 15, 2022 (JP) ................................ 2022-200578

(51) Int. Cl.
*G06F 3/044* (2006.01)

(52) U.S. Cl.
CPC .......... *G06F 3/0445* (2019.05); *G06F 3/0448* (2019.05)

(58) Field of Classification Search
CPC .. G06F 3/0445; G06F 3/0448; G06F 3/04166; G06F 3/0447; G06F 3/0354; G06F 3/041
See application file for complete search history.

(56) References Cited

U.S. PATENT DOCUMENTS

| | | | |
|---|---|---|---|
| 10,801,902 | B2 | 10/2020 | Kleczewski |
| 2008/0018596 | A1 | 1/2008 | Harley et al. |

(Continued)

FOREIGN PATENT DOCUMENTS

| | | |
|---|---|---|
| JP | 2008-097579 | 4/2008 |
| JP | 2013-015976 | 1/2013 |

(Continued)

OTHER PUBLICATIONS

International Search Report for PCT/JP2023/037491 mailed on Dec. 5, 2023.

(Continued)

*Primary Examiner* — Sahlu Okebato
(74) *Attorney, Agent, or Firm* — IPUSA, PLLC

(57) ABSTRACT

An input apparatus includes a skin having an operation surface; a first electrode arranged on a back side of the operation surface; second electrodes arranged facing the first electrode; an elastic member arranged between the skin and the second electrodes; and a processor connected to the second electrodes. The skin and the elastic member are elastically deformable by a pressing operation performed on the operation surface. The processor selects at least one second electrode from among the second electrodes as a driving electrode, selects at least one second electrode adjacent to the second electrode selected as the driving electrode, from among the second electrodes, as a detecting electrode, and switches a combination of the second electrodes selected from among the second electrodes as the driving electrode and the detecting electrode, and detects an output of the detecting electrode in a plurality of the combinations.

11 Claims, 12 Drawing Sheets

(56) References Cited

U.S. PATENT DOCUMENTS

| | | | |
|---|---|---|---|
| 2008/0164076 A1 | 7/2008 | Orsley | |
| 2016/0054813 A1 | 2/2016 | Schediwy et al. | |
| 2017/0364259 A1* | 12/2017 | Kamata | G06F 3/0233 |
| 2018/0095562 A1* | 4/2018 | Hashida | G06F 3/0446 |
| 2018/0328876 A1* | 11/2018 | Gradl | G01N 27/228 |
| 2022/0236817 A1* | 7/2022 | Kida | G06F 3/044 |
| 2023/0251749 A1 | 8/2023 | Watazu | |

FOREIGN PATENT DOCUMENTS

| | | |
|---|---|---|
| JP | 2016-133913 | 7/2016 |
| JP | 7091429 | 6/2022 |
| KR | 10-2019-0137823 | 12/2019 |

OTHER PUBLICATIONS

Korean Office Action for 10-2025-7019682 mailed on Apr. 16, 2026.

* cited by examiner

INPUT APPARATUS AND OUTPUT DETECTION METHOD IN INPUT APPARATUS

CROSS-REFERENCE TO RELATED APPLICATION

The present application is a continuation application of International Application No. PCT/JP2023/037491 filed on Oct. 17, 2023, which is based on and claims priority to Japanese Patent Application No. 2022-200578 filed on Dec. 15, 2022. The contents of these applications are incorporated herein by reference in their entirety.

BACKGROUND OF THE INVENTION

1. Field of the Invention

The present disclosure relates to an input apparatus and an output detection method in the input apparatus.

2. Description of the Related Art

Conventionally, there is a capacitance type pressure sensor provided with a first electrode sheet in which a first electrode layer is formed on a first insulating sheet; a second electrode sheet in which a second electrode layer is formed on a second insulating sheet; an elastic layer composed of a foamed sheet in which bubbles are dispersed and sandwiched between the first electrode sheet and the second electrode sheet; and an adhesive layer formed on each of the first electrode sheet-side surface and the second electrode sheet-side surface of the elastic layer; and when the first electrode sheet or the second electrode sheet is pressed, the pressing force is detected based on a change in the capacitance between the first electrode layer and the second electrode layer according to a change in the distance between the first electrode layer and the second electrode layer (see, for example, Patent Document 1).

[Patent Document 1] Japanese Patent No. 7091429

SUMMARY OF THE INVENTION

An input apparatus according to an embodiment of the present disclosure includes

- a skin having an operation surface;
- a first electrode arranged on a back side of the operation surface;
- a plurality of second electrodes arranged facing the first electrode;
- an elastic member arranged between the skin and the plurality of second electrodes;
- a processor connected to the plurality of second electrodes; and
- a memory storing instructions, wherein the skin and the elastic member are elastically deformable by a pressing operation performed on the operation surface by an operation body, and
- the instructions, when executed, cause the processor to execute:
  - selecting at least one second electrode from among the plurality of second electrodes as a driving electrode,
  - selecting at least one second electrode adjacent to the second electrode selected as the driving electrode, from among the plurality of second electrodes, as a detecting electrode, and
  - switching a combination of the second electrodes selected from among the plurality of second electrodes as the driving electrode and the detecting electrode, and detecting an output of the detecting electrode in a plurality of the combinations.

An output detection method in an input apparatus according to an embodiment of the present disclosure, the input apparatus including:

- a skin having an operation surface;
- a first electrode arranged on a back side of the operation surface;
- a plurality of second electrodes arranged facing the first electrode;
- an elastic member arranged between the skin and the plurality of second electrodes;
- a processor connected to the plurality of second electrodes; and
- a memory storing instructions, when executed, cause the processor to execute the output detection method, wherein
- the skin and the elastic member are elastically deformable by a pressing operation performed on the operation surface by an operator,
- the output detection method including:
  - selecting at least one second electrode from among the plurality of second electrodes as a driving electrode,
  - selecting at least one second electrode adjacent to the second electrode selected as the driving electrode, from among the plurality of second electrodes, as a detecting electrode, and
  - switching a combination of the second electrodes selected from among the plurality of second electrodes as the driving electrode and the detecting electrode, and detecting an output of the detecting electrode in a plurality of the combinations.

DETAILED DESCRIPTION OF THE PREFERRED EMBODIMENTS

In the conventional capacitance type pressure sensor, the position of the pressing operation and the planar positional relationship between the first electrode layer and the second electrode layer change, depending on the position where the pressing operation is performed, and the amount of change in the capacitance between the first electrode layer and the second electrode layer may differ greatly. If the amount of change in the capacitance detected differs greatly depending on the position of the pressing operation, the detection accuracy of the amount of operation of the pressing operation decreases.

Therefore, an object of the present invention is to provide an input apparatus capable of detecting the amount of operation of the pressing operation with high accuracy, and an output detection method in the input apparatus.

Hereinafter, an embodiment in which an input apparatus and an output detection method of the input apparatus of the present disclosure are applied, will be described.

EMBODIMENT

Hereinafter, an XYZ coordinate system will be defined and described. The direction parallel to the X axis (X direction), the direction parallel to the Y axis (Y direction), and the direction parallel to the Z axis (Z direction) are orthogonal to each other. In the following, for convenience of explanation, the side in the −Z direction may be referred to as the lower side or down, and the side in the +Z direction may be referred to as the upper side or up. However, this does not indicate a universal vertical relationship. Further, a plan view refers to viewing the X-Y surface.

In the following, the length, thickness, etc., of each part may be exaggerated to make the structure easier to understand. Further, words such as parallel, vertical, etc., may allow a deviation to the extent that they do not impair the effect of the embodiment.

EMBODIMENT

Figure 1:
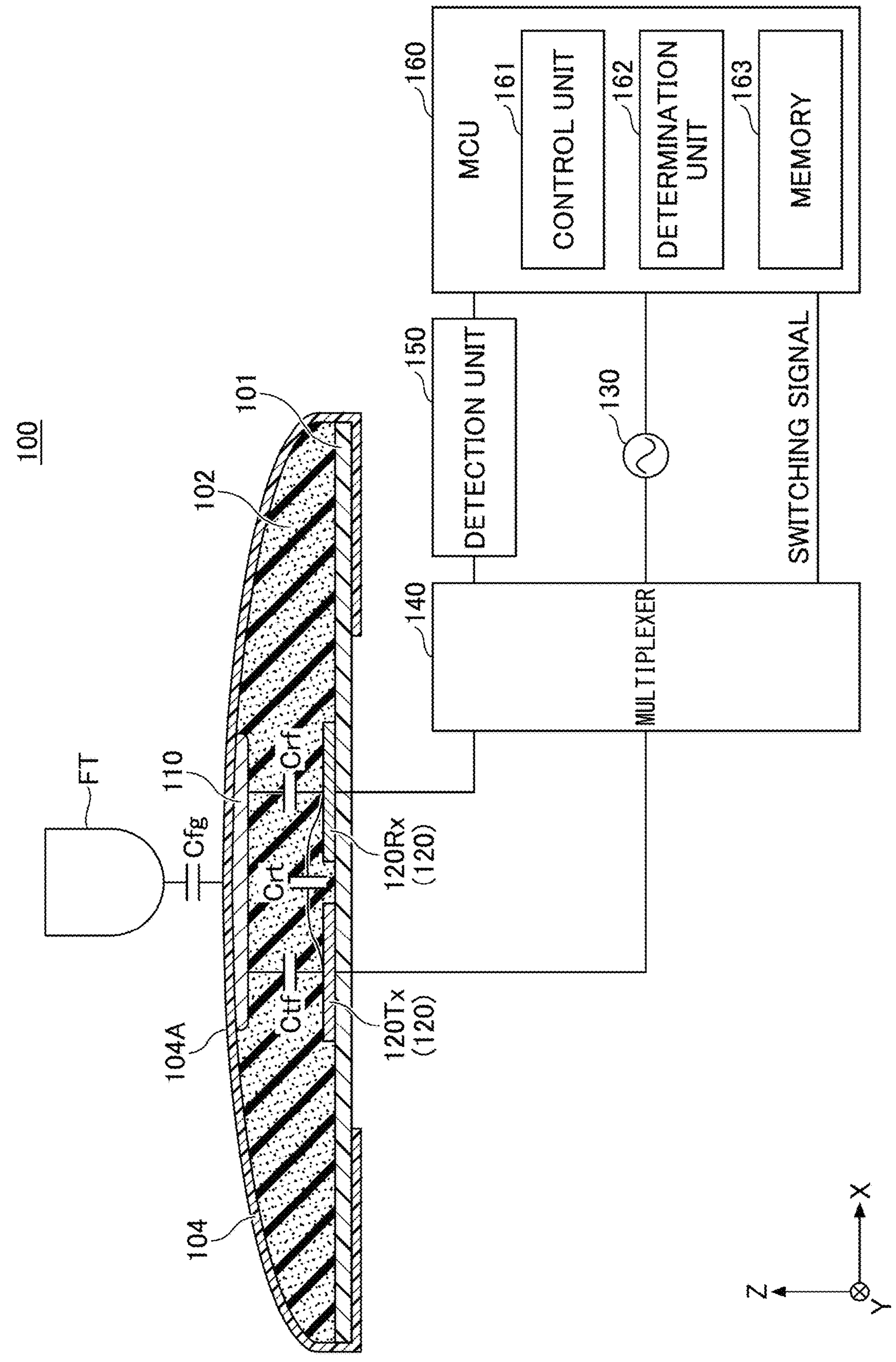
FIG. 1 is a cross-sectional view illustrating an example of the configuration of the input apparatus according to the embodiment.

FIG. 1 is a cross-sectional view illustrating an example of the configuration of an input apparatus 100 according to the embodiment.

<Configuration of the Input Apparatus 100>

The input apparatus 100 includes a substrate 101, a foamed layer 102, a skin 104, a floating electrode 110, a plurality of electrodes 120, a driving electrode 120Tx, a detecting electrode 120Rx, a power supply 130, a multiplexer 140, a detection unit 150, and an MCU (Micro Controller Unit) 160. The foamed layer 102 is an example of an elastic member that can be deformed by an operator's pressing operation. The upper surface of the skin 104 is the operation surface 104A of the input apparatus 100. The floating electrode 110 is an example of a first electrode. The plurality of electrodes 120 is an example of a plurality of second electrodes, and the driving electrode 120Tx and the detecting electrode 120Rx are selected from among the plurality of electrodes 120. Therefore, the driving electrode 120Tx and the detecting electrode 120Rx are denoted by the reference numeral 120 in parentheses. The MCU 160 is an example of a control unit.

The input apparatus 100 selects an electrode 120 to be used as the driving electrode 120Tx and the detecting electrode 120Rx from among the plurality of electrodes 120 provided on the upper surface of the substrate 101. This configuration will be described below with reference to FIGS. 3A and 3B.

The input apparatus 100 is an apparatus for determining whether the fingertip FT, which is an example of an operation body, performs an operation of approaching, touching, or pressing the operation surface 104A of the input apparatus 100. The input apparatus 100 determines whether an operation of the mutual capacitance method has been performed, based on the capacitance (mutual capacitance) between the driving electrode 120Tx and the detecting electrode 120Rx. Hereinafter, the operation of approaching, touching, or pressing may be referred to as an approaching operation, a touching operation, or a pressing operation. The operation body is not limited to the fingertip FT.

The pressing operation is an operation in which the operation surface 104A is pressed downward by the fingertip FT. The touching operation is an operation in which the fingertip FT touches the operation surface 104A but is not pressing downward. The approaching operation is an operation in which the fingertip FT does not touch the operation surface 104A but the fingertip FT is brought closer to the operation surface 104A as the capacitance between the driving electrode 120Tx and the detecting electrode 120Rx increases to some extent.

When the approaching operation, the touching operation, and the pressing operation are performed on the operation surface 104A, the capacitance between the driving electrode 120Tx and the detecting electrode 120Rx increases in the order of the approaching operation, the touching operation, and the pressing operation. Therefore, the input apparatus 100 can determine the approaching operation, the touching operation, and the pressing operation by using a threshold of capacitance for determining the approaching operation, the touching operation, and the pressing operation.

Hereinafter, the determining method of the approaching operation and the touching operation is omitted, and mainly, the input apparatus 100 capable of detecting the operation amount of the pressing operation with high accuracy, and the output detection method in the input apparatus are described.

Hereinafter, the capacitance between the fingertip FT and the floating electrode 110 is Cfg, the capacitance between the floating electrode 110 and the driving electrode 120Tx is Ctf, the capacitance between the floating electrode 110 and the detecting electrode 120Rx is Crf, and the capacitance between the driving electrode 120Tx and the detecting electrode 120Rx is Crt.

<Substrate 101>

The substrate 101 is provided under the input apparatus 100. The substrate 101 is, for example, a wiring substrate. The driving electrode 120Tx and the detecting electrode 120Rx are provided on the upper surface of the substrate 101.

<Foamed Layer 102>

The foamed layer 102 has a depth (width) in the Y direction and is rectangular in a plan view as an example. The foamed layer 102 is arranged on the upper surface of the substrate 101. The driving electrode 120Tx and the detecting electrode 120Rx are sandwiched between the upper surface of the substrate 101 and the foamed layer 102.

The foamed layer 102 has, as an example, a shape in which the upper surface and the four sides are continuously curved. The foamed layer 102 can be made of a foamed material such as foamed urethane, foamed sponge, or foamed rubber, and has cushioning properties. The foamed layer 102 is provided on the substrate 101, and the entire upper surface and the four sides are covered by the skin 104.

The foamed layer 102 is thicker than the skin 104. This is to improve the tactile feeling sensed by the fingertip FT at the time of the pressing operation, by thickening the member which is easier to deform elastically than the skin 104. When detecting the pressing operation by using the floating electrode 110, the driving electrode 120Tx, and the detecting electrode 120Rx, the floating electrode 110, the driving electrode 120Tx, and the detecting electrode 120Rx are separated to some extent to facilitate detection.

<Skin 104>

The skin 104 is a cloth-like cover made of resin, synthetic fiber, synthetic leather, or leather, and has a configuration of covering the entire outer surface of the foamed layer 102 and the shape easily changes along the shape of the outer surface of the foamed layer 102.

The skin 104 has an operation surface 104A. The operation surface 104A is an upper surface of the skin 104 and is a decorative layer exposed to an operator. A floating electrode 110 is provided at the center of the lower surface of the skin 104 in a plan view. The operation surface 104A is at least a portion of the outer surface of the skin 104 that overlaps with the floating electrode 110.

The skin 104 may be made of a material having transparency together with the floating electrode 110. Transparency is a property of transmitting visible light, and the degree of transparency may be set to any degree. In this case, the skin 104 and the floating electrode 110 may be transparent, and the foamed layer 102 may be visible. For example, the skin 104 may be illuminated by providing a light source on the upper surface of the substrate 101, or a decorative layer may be provided on the lower surface of the skin 104.

As an example, the skin 104 is folded back to the lower surface of the substrate 101 while covering the upper and side surfaces of the foamed layer 102, and fixed to the lower surface of the substrate 101. In this state, the floating electrode 110 contacts the outer surface of the foamed layer 102.

Although the skin 104 is a cloth-like cover covering the entire outer surface of the foamed layer 102, the skin 104 may be a bag-shaped cover. As long as the skin 104 covers at least the upper surface of the foamed layer 102, for example, the skin 104 may cover only the upper surface of the foamed layer 102 or cover the upper and side surfaces of the foamed layer 102.

<Floating Electrode 110>

The floating electrode 110 is provided at the center of the lower surface of the skin 104 in a plan view. As an example, the floating electrode 110 is formed by printing silver paste or the like on the lower surface of the skin 104. The floating electrode 110 is electrically floating. The floating electrode 110 faces the driving electrode 120Tx and the detecting electrode 120Rx, and is electromagnetically coupled to the driving electrode 120Tx and the detecting electrode 120Rx. The floating electrode 110 is not limited to being formed by printing, but may be formed by vapor deposition on the lower surface of the skin 104.

The floating electrode 110 is provided in order to mitigate the variation of the output of the detecting electrode 120Rx depending on the position of the pressing operation. This is because, by providing the floating electrode 110 electromagnetically coupled to the driving electrode 120Tx and the detecting electrode 120Rx on the side of the operation surface 104A of the driving electrode 120Tx and the detecting electrode 120Rx, the variation of the output of the detecting electrode 120Rx depending on the position of the pressing operation can be mitigated compared to the case where the floating electrode 110 is not present. Therefore, the floating electrode 110 preferably has the same size as the plurality of electrodes 120 in a plan view, but may be smaller or larger than the plurality of electrodes 120. If the skin 104 is formed of a transparent material, the floating electrode 110 may also be formed of a transparent material.

<Multiple Electrodes 120>

The multiple electrodes 120 are provided at the center of the upper surface of the substrate 101 and face the floating electrode 110. As an example, the multiple electrodes 120 are made of copper foil, and are formed by patterning copper foil or the like provided on the upper surface of the substrate 101.

The plurality of electrodes 120 are connected to the multiplexer 140 via wiring of the substrate 101 and wiring provided outside the substrate 101. At least one of the plurality of electrodes 120 is selected as the driving electrode 120Tx, and at least one electrode 120 adjacent to the driving electrode 120Tx is selected as the detecting electrode 120Rx. A plurality of the driving electrodes 120Tx may be provided.

<Driving Electrode 120Tx>

The driving electrode 120Tx is provided at the center of the upper surface of the substrate 101 and faces the floating electrode 110. The driving electrode 120Tx is connected to the power supply 130 via a multiplexer 140.

<Detecting Electrode 120Rx>

The detecting electrode 120Rx is provided at the center of the upper surface of the substrate 101 and faces the floating electrode 110. The detecting electrode 120Rx is connected to the detection unit 150 via the multiplexer 140.

Because the driving electrode 120Tx and the detecting electrode 120Rx are selected from among a plurality of electrodes 120 provided on the upper surface of the substrate 101, the electrode 120 selected as the driving electrode 120Tx and the electrode 120 selected as the detecting electrode 120Rx are switched in a time division manner among the plurality of electrodes 120. Details of this will be described later with reference to FIGS. 3A to 3C.

<Power Supply 130>

The power supply 130 is connected between the multiplexer 140 and the MCU 160, and outputs an AC drive voltage to the multiplexer 140 when driven by a control unit 161 of the MCU 160. The AC drive voltage is supplied to the driving electrode 120Tx via the multiplexer 140. The power supply 130 may be an AC power supply capable of outputting an AC drive voltage.

<Multiplexer 140>

The multiplexer 140 is connected between the driving electrode 120Tx and the detecting electrode 120Rx, and the power supply 130 and the detection unit 150.

The driving electrode 120Tx and the detecting electrode 120Rx are selected from a plurality of electrodes 120 provided on the upper surface of the substrate 101. The electrode 120 selected as the driving electrode 120Tx and the electrode 120 selected as the detecting electrode 120Rx are switched in a time division manner. Therefore, the multiplexer 140 is provided between the driving electrode 120Tx and the detecting electrode 120Rx, and the power supply 130 and the detection unit 150.

The multiplexer 140 switches the connection state so as to connect the driving electrode 120Tx and the power supply 130 and also connect the detecting electrode 120Rx and the detection unit 150 according to a switching signal input from the control unit 161 of the MCU 160.

When a determination unit 162 of the MCU 160 determines whether or not an operation has been performed by the fingertip FT, the power supply 130 applies an AC driving voltage to the driving electrode 120Tx, so the multiplexer 140 connects the selected driving electrode 120Tx and the power supply 130 according to the switching signal.

Further, because the detection unit 150 detects the output of the detecting electrode 120Rx when the determination unit 162 of the MCU 160 determines whether the fingertip FT has performed an operation, the multiplexer 140 connects the selected detecting electrode 120Rx and the detection unit 150 according to the switching signal.

<Detection Unit 150>

The detection unit 150 is connected to the detecting electrode 120Rx via the multiplexer 140, and detects the current flowing through the detecting electrode 120Rx, and detects the capacitance by integrating the current. The detection unit 150 converts the detected capacitance into a digital value and outputs the digital value. The detection unit 150 functions as an AD (analog to digital) converter. The detection unit 150 outputs the capacitance obtained by digital conversion to the MCU 160.

<MCU 160>

The MCU 160 includes the control unit 161, the determination unit 162, and a memory 163. The MCU 160 is implemented by a computer including a CPU (Central Processing Unit), RAM (Random Access Memory), ROM (Read Only Memory), an input/output interface, an internal bus, and the like.

The control unit 161 and the determination unit 162 represent the functions of the programs executed by the MCU 160 as functional blocks. The memory 163 functionally represents the memory of the MCU 160.

The control unit 161 is a processing unit that controls the operation of the MCU 160, and drives the power supply 130 and performs other processing, for example.

While selecting the driving electrode 120Tx and the detecting electrode 120Rx, the control unit 161 drives the power supply 130 and outputs a switching signal to the multiplexer 140. In this way, the driving electrode 120Tx and the detecting electrode 120Rx are selected from the plurality of electrodes 120, the AC driving voltage is supplied from the power supply 130 to the driving electrode 120Tx via the multiplexer 140, and the output of the detecting electrode 120Rx is detected by the detection unit 150 via the multiplexer 140.

The determination unit 162 determines whether an operation has been performed based on the output (capacitance) of the detection unit 150. As an example, the determination unit 162 can determine whether the operation of approaching, touching, or pressing is performed.

The memory 163 stores programs, data, and the like necessary for the control unit 161 and the determination unit 162 to execute the processing.

<Operation of the Input Apparatus 100>

Figure 2:
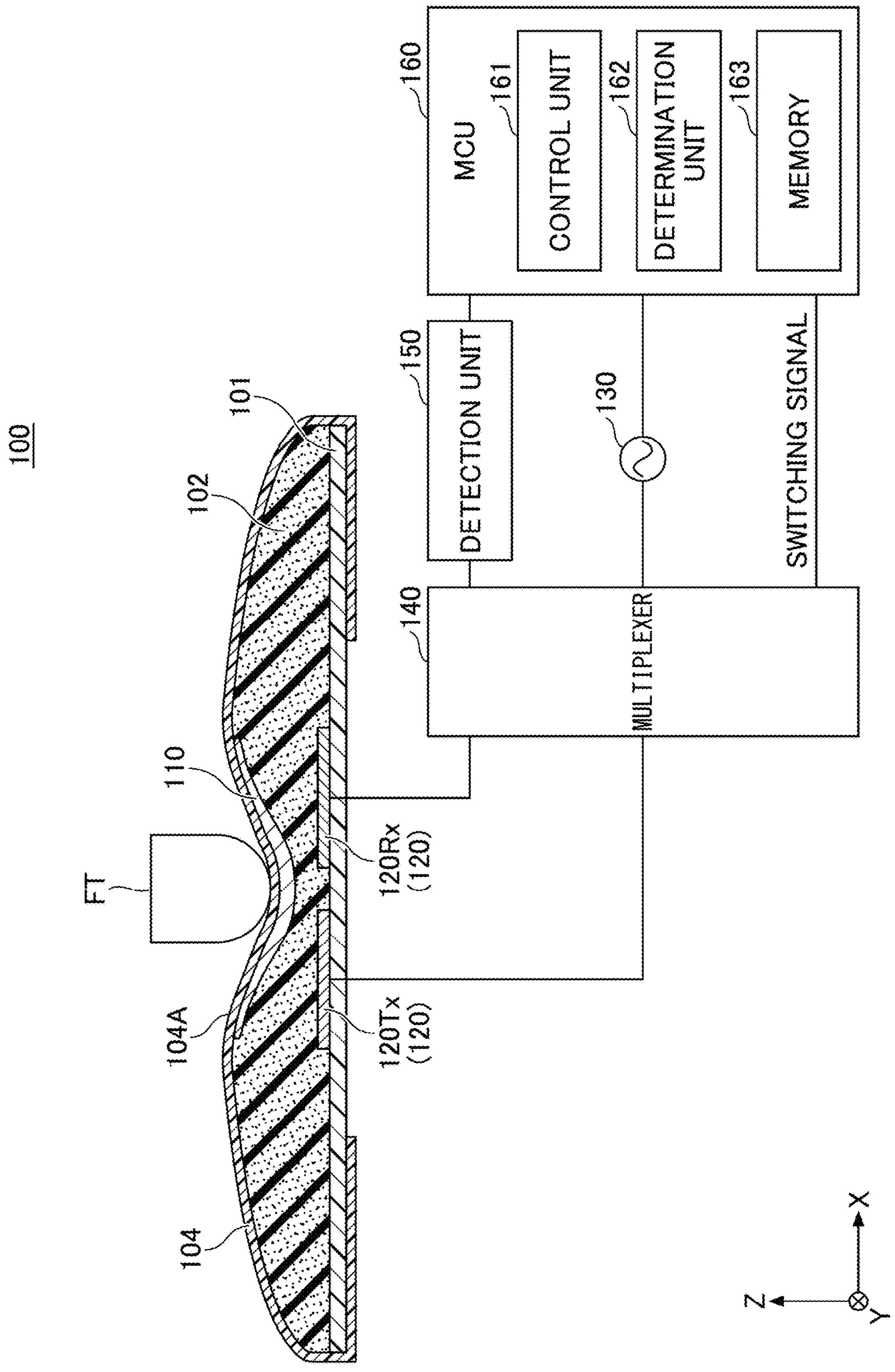
FIG. 2 is a diagram illustrating an example of a state in which a pressing operation is performed on the input apparatus according to the embodiment.

FIG. 2 illustrates an example of a state in which the pressing operation is performed on the input apparatus 100. When the central part of the skin 104 is pressed downward with the fingertip FT, the skin 104, the driving electrode 120Tx, and the foamed layer 102 are bent as illustrated in FIG. 2, and the distance from the floating electrode 110 to the driving electrode 120Tx and the detecting electrode 120Rx becomes short. In this state, the determination unit 162 determines that a pressing operation is performed. Further, when the fingertip FT is in contact with the operation surface 104A but is not pressing downward, the determination unit 162 determines that a touching operation is performed. Further, when the fingertip FT does not touch the operation surface 104A but is close to it, and the capacitance between the driving electrode 120Tx and the detecting electrode 120Rx increases to some extent, the determination unit 162 determines that an approaching operation is being performed.

<Configuration of Multiple Electrodes 120>

Figure 3A:
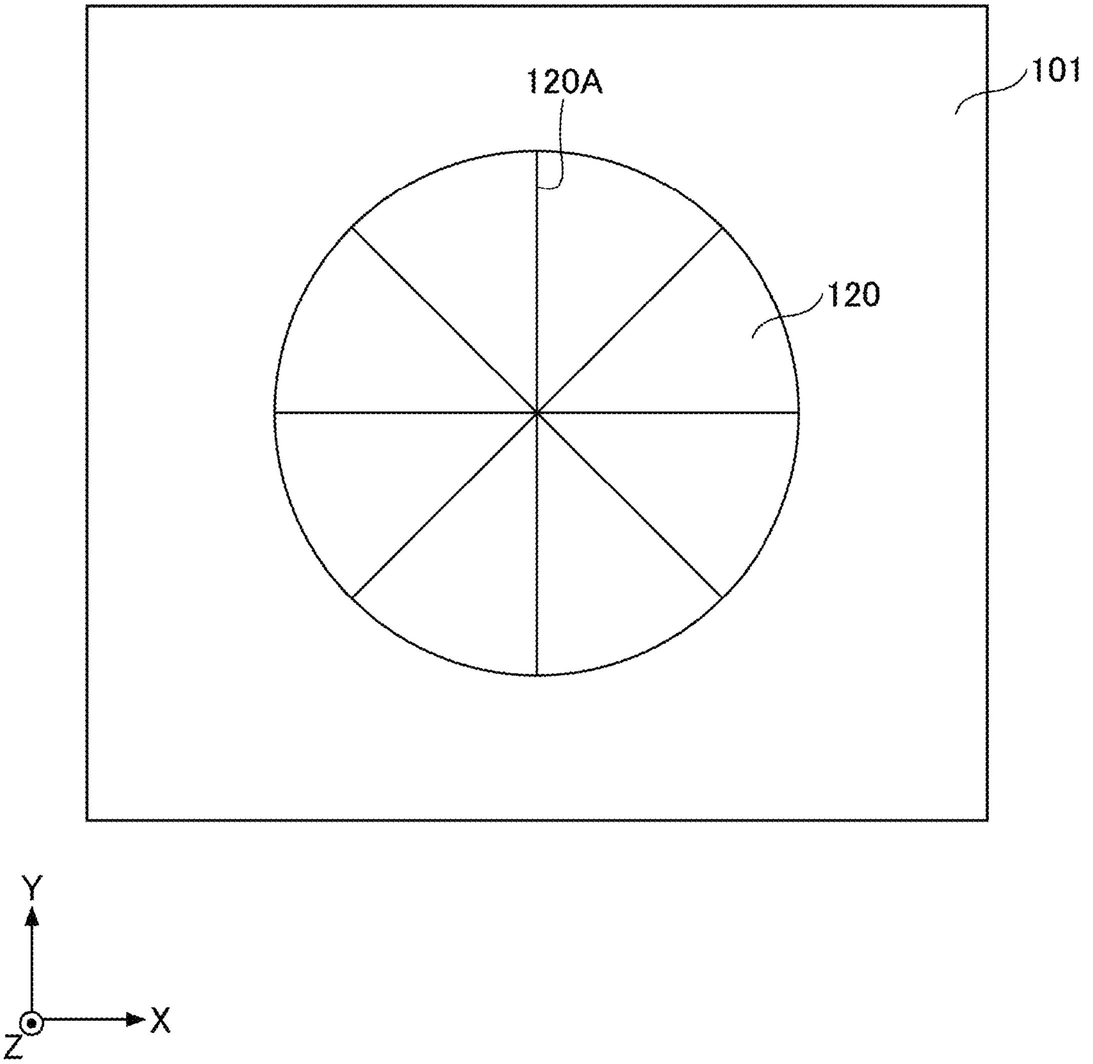
FIG. 3A is a diagram illustrating an example of a planar configuration of a plurality of electrodes.

FIG. 3A illustrates an example of the planar configuration of the multiple electrodes 120. As an example, the multiple electrodes 120 are provided at the center of the upper surface of the substrate 101.

The multiple electrodes 120 are circular as a whole and have a shape in which a circle is divided into 8 equal parts with respect to the center. That is, each electrode 120 has a fan-like shape with a center angle of 45 degrees in a plan view. Thus, the multiple electrodes 120 are preferably obtained by dividing the circle into N equal parts in a plan view, where the number of divisions is N (N is an integer of 3 or more). By using a plurality of electrodes 120 having equally divided shapes, the operation position with respect to the operation surface 104A can be properly detected.

As an example, such eight electrodes 120 can be produced by dividing circularly patterned copper foil into eight equal parts with respect to the center. The eight electrodes 120 are separated from each other and are not electrically connected. A boundary 120A between the adjacent electrodes 120 is linear in a plan view. The boundary 120A is an example of the boundary between the adjacent second electrodes. The eight electrodes 120 have eight boundaries 120A.

Here, a configuration in which eight electrodes 120 are formed by dividing a circular electrode into eight equal parts is described, but as long as a plurality of electrodes 120 having the same size and shape are provided, the number of electrodes 120 is not limited to eight, and the overall shape is not limited to a circular shape. The overall shape of the combined electrodes 120 may be an ellipse, a triangle, a quadrangle, or a polygon of five angles or greater.

<Combination of Selection of the Driving Electrode 120Tx and the Detecting Electrode 120Rx>

Figure 3B:
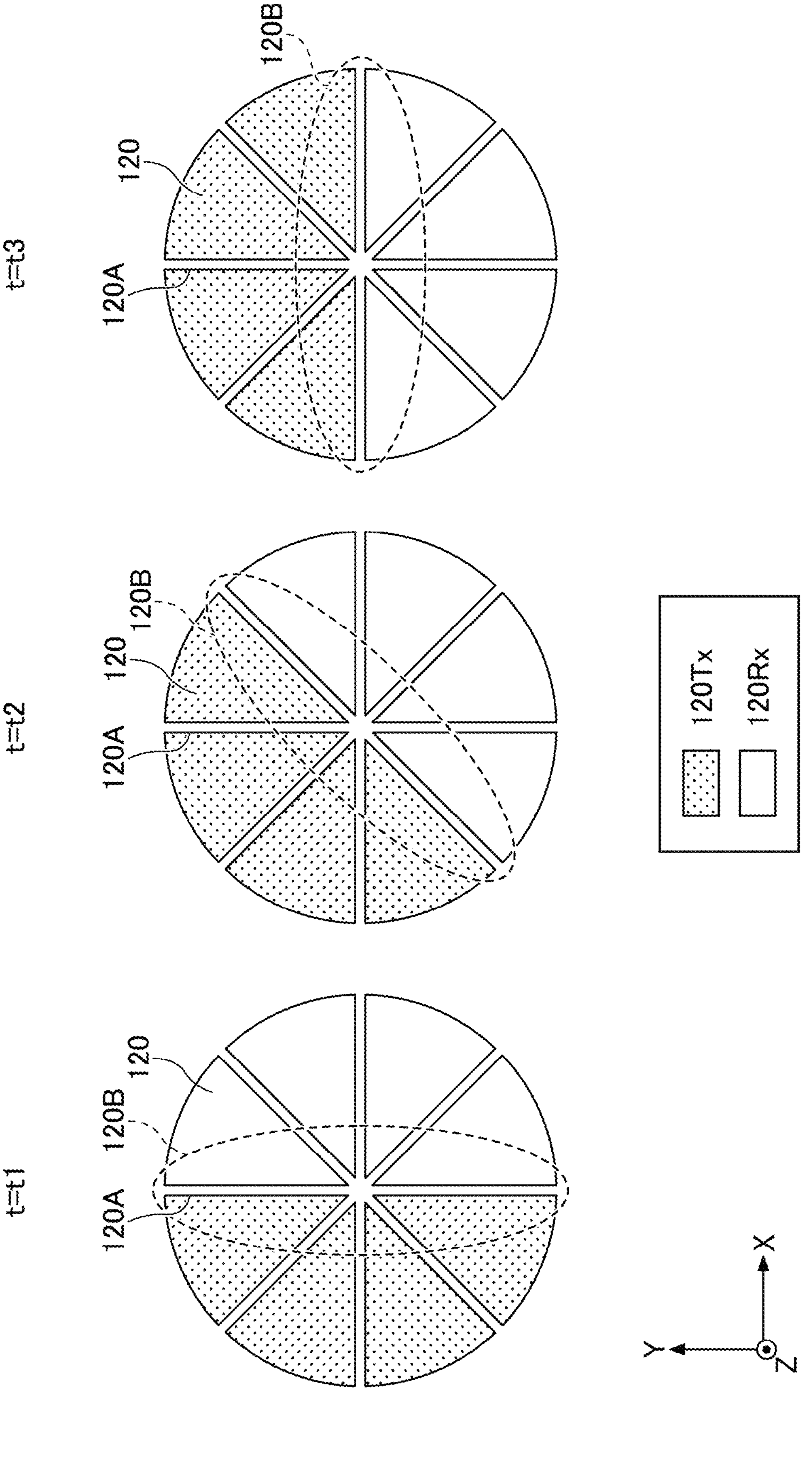
FIG. 3B is a diagram illustrating an example of a combination of selections of a driving electrode and a detecting electrode.

FIG. 3B illustrates an example of a combination of selection of the driving electrode 120Tx and the detecting electrode 120Rx. FIG. 3B illustrates an example of a combination of selection at times t1, t2, and t3. In FIG. 3B, the electrode 120 selected as the driving electrode 120Tx is indicated by dots, and the electrode 120 selected as the detecting electrode 120Rx is indicated by a blank. In FIG. 3B, the substrate 101 is omitted.

Here, among the eight electrodes 120, four adjacent electrodes 120 are selected as the driving electrodes 120Tx, and the remaining four adjacent electrodes are selected as the detecting electrodes 120Rx. The four driving electrodes 120Tx and the four detecting electrodes 120Rx are each arranged in a semicircular shape.

The four driving electrodes 120Tx are supplied with AC driving voltages from the power supply 130 via the multiplexer 140. The four detecting electrodes 120Rx are connected to the detection unit 150 via the multiplexer 140. Therefore, the detection unit 150 detects the capacitances of the four detecting electrodes 120Rx.

In FIG. 3B, the boundary 120B between the four driving electrodes 120Tx and the four detecting electrodes 120Rx is indicated by being surrounded by a dashed ellipse. Here, among the eight boundaries 120A of the eight electrodes 120, the boundary between the four driving electrodes 120Tx and the four detecting electrodes 120Rx is distinguished as the boundary 120B.

The boundary 120B between the driving electrodes 120Tx and the detecting electrodes 120Rx is a portion where the capacitance Crt (see FIG. 1) is obtained. In the boundary 120B, when the foamed layer 102 bends by the pressing operation, the distance from the floating electrode 110 to the driving electrodes 120Tx and the detecting electrodes 120Rx becomes shorter, and the capacitances Ctf and Crf (see FIG. 1) increase. Because the capacitances Ctf and Crf increase by the pressing operation, the boundary 120B is a portion that causes the output of the detecting electrodes 120Rx to vary greatly. That is, the boundary 120B between the driving electrodes 120Tx and the detecting electrodes 120Rx is the part with the highest sensitivity of the output of the detecting electrode 120Rx among the eight electrodes 120 in a plan view. The detection unit 150 detects the capacitance Crt of the boundary 120B.

Because the boundary 120B is located on a straight line passing through the center of the eight electrodes 120, the output of the detecting electrode 120Rx varies depending on the position of the pressing operation with respect to the circular area where the eight electrodes 120 are provided in a plan view. Such variation of the output of the detecting electrode 120Rx affects the detection of the amount of operation of the pressing operation. The variation of the output of the detecting electrode 120Rx depending on the position of the pressing operation can be mitigated to some extent by providing the floating electrode 110, but because the output of the detecting electrode 120Rx varies depending on the positional relationship between: the fingertip FT; and the driving electrode 120Tx and the detecting electrode 120Rx in a plan view, the mitigation by the floating electrode 110 alone is not sufficient.

Therefore, the input apparatus 100 of the embodiment shifts the position of the boundary 120B where the detection sensitivity is high in a time division manner, by shifting the combination of the electrodes 120 of four of each type of electrodes selected as the four driving electrodes 120Tx and the four detecting electrodes 120Rx one by one as an example, at times t1, t2, and t3. The selection of the combination of the electrodes 120 of four of each type of electrodes is executed by the control unit 161 of the MCU 160.

By shifting the boundary 120B between the driving electrodes 120Tx and the detecting electrodes 120Rx in a time division manner, the detection sensitivity is equalized over all of the eight electrodes 120. By equalizing the detection sensitivity over all of the eight electrodes 120, the operation amount of the pressing operation can be detected with high accuracy.

Figure 3C:
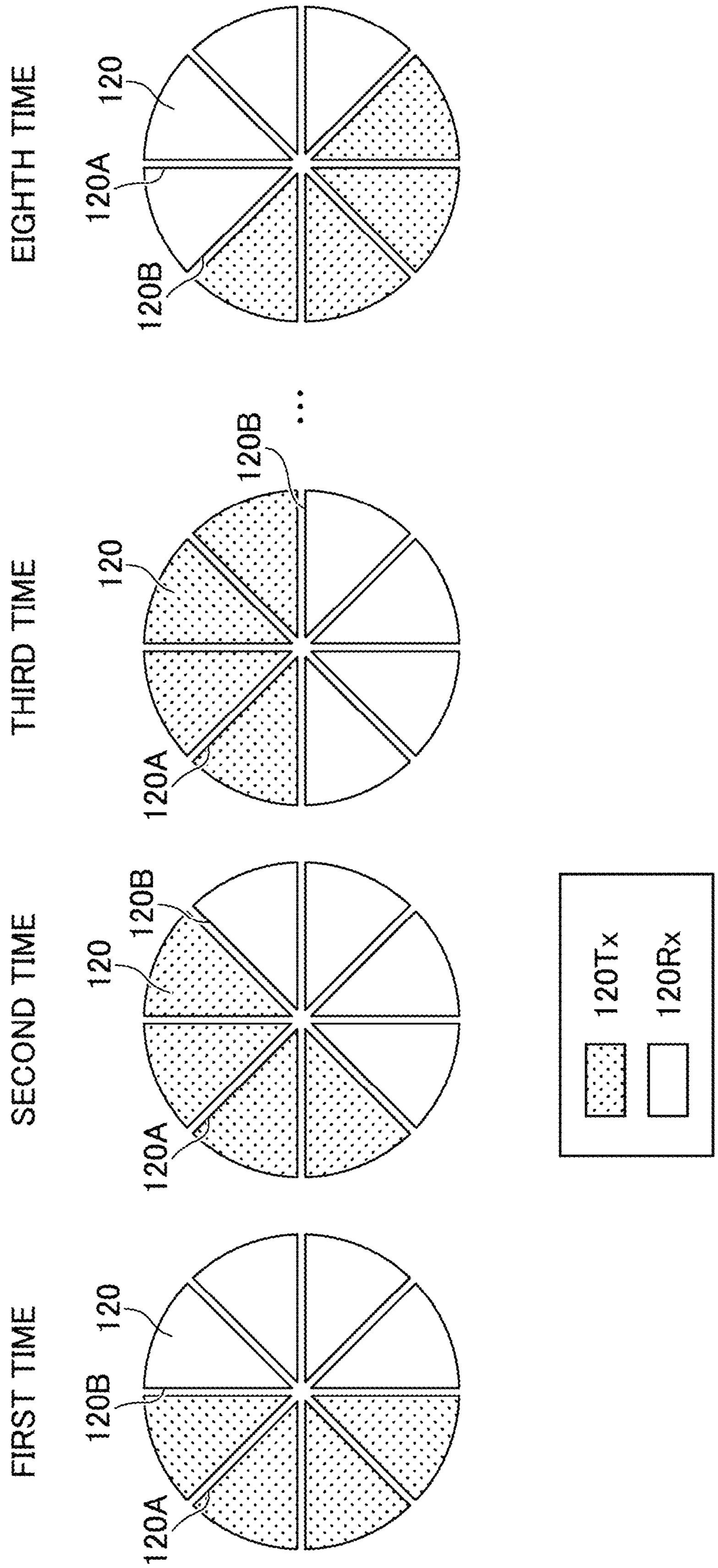
FIG. 3C is a diagram illustrating an example of a combination of selections of a driving electrode and a detecting electrode by changing the combination eight times.

FIG. 3C illustrates an example of the combination of selecting the driving electrodes 120Tx and the detecting electrodes 120Rx by changing the combination eight times. If the electrodes 120 of four of each type of electrodes selected as the four driving electrodes 120Tx and the four detecting electrodes 120Rx are shifted one by one eight times consecutively, the four driving electrodes 120Tx and the four detecting electrodes 120Rx complete one revolution, as in the first to eighth combinations in FIG. 3C. This is equivalent to the fact that the boundary 120B illustrated in FIG. 3B completes one revolution.

For example, the operation amount of the pressing operation may be detected based on the output of the detecting electrode 120Rx while shifting the position of the boundary 120B between the four driving electrodes 120Tx and the four detecting electrodes 120Rx in the form described above. Because the operation amount of the pressing operation is the pressing amount of the operation surface 104A, the pressing force when the operation surface 104A is pressed can be detected by detecting the output (capacitance) of the detecting electrode 120Rx.

As illustrated in FIG. 3C, by rotating once the detecting electrodes 120 selected as the four driving electrodes 120Tx and the four detecting electrodes 120Rx one by one, the determination unit 162 of the MCU 160 switches the combination of the electrodes 120 selected as the driving electrodes 120Tx and the detecting electrodes 120Rx multiple times so that each of the plurality of electrodes 120 is selected as the detecting electrode 120Rx at least once. The plurality of electrodes 120 have a plurality of boundaries 120A between adjacent electrodes 120. The MCU 160 switches the combination of the electrodes 120 selected as the driving electrodes 120Tx and the detecting electrodes 120Rx multiple times so that each of the plurality of boundaries 120A is located between the driving electrode 120Tx and the detecting electrode 120Rx at least once.

<Simulation Result>

Figure 4:
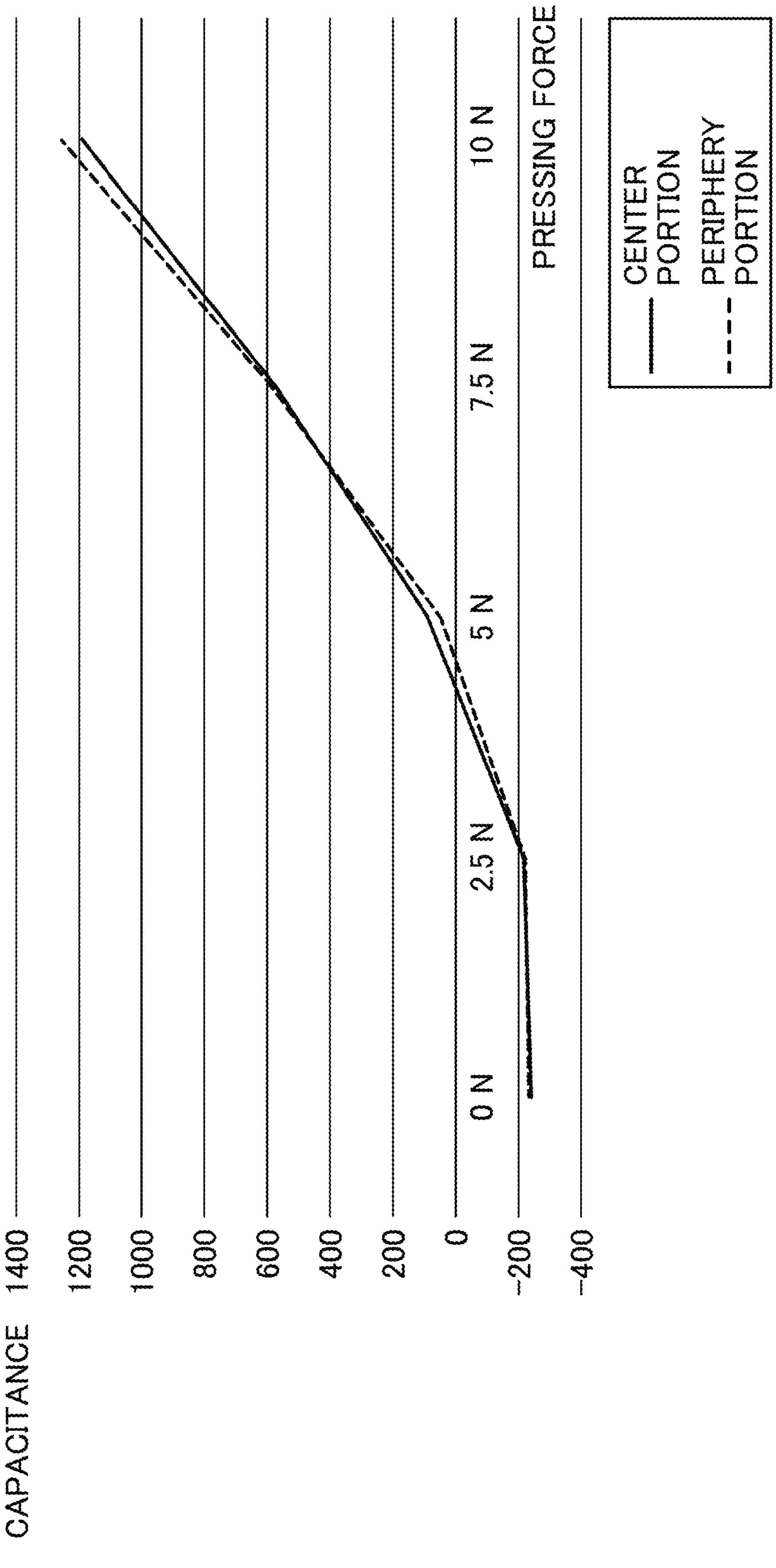
FIG. 4 is a diagram illustrating an example of a relationship between a pressing force when a pressing operation is performed and a capacitance detected by a detection unit.

FIG. 4 illustrates an example of the relationship between the pressing force when the pressing operation is performed at the input apparatus 100 and the capacitance detected by the detection unit 150. FIG. 4 illustrates the calculation result in a simulation in which the pressing operation is performed on the central portion of the operation surface 104A and the peripheral portion of the operation surface 104A. In the simulation, as illustrated in FIG. 3A, four driving electrodes 120Tx and four detecting electrodes 120Rx were selected from the eight electrodes 120, and as illustrated in FIG. 3B, the electrodes 120 were shifted one by one and the boundary 120B was rotated at least once, thereby calculating the capacitance detected by the detection unit 150.

The central portion of the operation surface 104A is the central portion of the eight electrodes 120 in a plan view, and the peripheral portion of the operation surface 104A is the portion outside the central portion of the circular region of the eight electrodes 120 in a plan view.

In FIG. 4, the horizontal axis represents the pressing force (N). 0 N on the horizontal axis represents a position where the pressing force is zero, and represents a state in which the fingertip FT touches the operation surface 104A (a state in which a touching operation is performed). The vertical axis represents the capacitance detected by the detection unit 150 as a count value (without units). The characteristic of the pressing operation to the center of the operation surface 104A is illustrated by the solid line, and the characteristic of the pressing operation to the periphery of the operation surface 104A is illustrated by the dashed line.

As illustrated in FIG. 4, the capacitance of the pressing operation (solid line) to the center of the operation surface 104A and the capacitance of the pressing operation (dashed line) to the periphery of the operation surface 104A are very close. The capacitance starts to increase at about 2.5 N. The pressing force of 2.5 N is a relatively weak force that is required, for example, to operate a button of an electronic device, etc., and is an appropriate value for the operating load of an operation unit of an electronic device, etc., provided inside a vehicle.

In the characteristics illustrated in FIG. 4, the count value of the capacitance is negative when the pressing force is about 4 N or less, but by detecting the self-capacitance of the detecting electrode 120Rx and correcting the mutual capacitance between the driving electrode 120Tx and the detecting electrode 120Rx based on the self-capacitance, the count value of the capacitance can be reduced to approximately zero when the pressing force is 0 N.

As described above, it was found that the capacitance of the pressing operation (solid line) to the center of the operation surface 104A and the capacitance of the pressing operation (dashed line) to the periphery of the operation surface 104A indicated very close values. Thus, it was confirmed that the input apparatus 100 of the embodiment can detect the operation amount of the pressing operation with high accuracy regardless of the position where the pressing operation is performed on the operation surface 104A.

Effect

An input apparatus 100 includes the skin 104 having the operation surface 104A, the first electrode (the floating electrode 110) arranged on the back side of the operation surface 104A, the plurality of electrodes 120 arranged facing the first electrode (the floating electrode 110), the foamed layer 102 arranged between the skin 104 and the plurality of electrodes 120, and the MCU 160 connected to the plurality of electrodes 120, wherein the skin 104 and the foamed layer 102 are elastically deformable by a pressing operation on the operation surface 104A by the fingertip FT, wherein the MCU 160 selects at least one electrode 120 from among the plurality of electrodes 120 as a driving electrode 120 Tx, and selects at least one electrode 120 adjacent to the electrode 120 selected as the driving electrode 120 Tx from among the plurality of electrodes 120 as a detecting electrode 120Rx, the combination of the electrodes 120 selected as the driving electrode 120Tx and the detecting electrode 120Rx is switched among the plurality of electrodes 120, and the output of the detecting electrode 120Rx in the plurality of combinations is detected.

Therefore, by detecting the output of the detecting electrode 120Rx in the plurality of combinations of the electrodes 120 selected as the driving electrode 120Tx and the detecting electrode 120Rx, the output of the detecting electrode 120Rx is equalized regardless of the position of the pressing operation with respect to the first electrode (the floating electrode 110), the driving electrode 120Tx, and the detecting electrode 120Rx.

Therefore, it is possible to provide the input apparatus 100 capable of detecting the operation amount of the pressing operation with high accuracy.

Further, in order to equalize the output of the detecting electrode 120Rx regardless of the position of the pressing operation, in addition to the above-described method of switching the combination of the electrodes 120 selected as the driving electrode 120Tx and the detecting electrode 120Rx, it is also possible to consider, for example, a method in which the driving electrode 120Tx and the detecting electrode 120Rx have shapes that are inserted into each other in a plan view and the combination is not switched as described above. Even if the driving electrode 120Tx and the detecting electrode 120Rx have shapes that are inserted into each other in a plan view, it is possible to prevent unevenness in the output of the detecting electrode 120Rx depending on the position of the pressing operation. However, when the driving electrode 120Tx and the detecting electrode 120Rx have shapes that are inserted into each other in a plan view, it is difficult to detect the operation amount because the capacitance (mutual capacitance) does not change sufficiently with respect to the change of the operation amount even if the pressing operation is performed. Such an event occurs similarly in both the case where the pressing operation is performed on the central part of the operation surface 104A and the case where the pressing operation is performed on the peripheral part of the operation surface 104A.

On the other hand, in the input apparatus 100 of the embodiment, the configuration of the electrodes 120 is simple, the manufacturing cost can be reduced, and the output of the detecting electrode 120Rx can be equalized regardless of the position of the pressing operation, by switching the combination of the electrodes 120 selected as the driving electrode 120Tx and the detecting electrode 120Rx. As a result, the input apparatus 100 capable of detecting the operation amount of the pressing operation with high accuracy can be provided.

Because the first electrode (the floating electrode 110) is a floating electrode 110, it is not necessary to connect it to another detection circuit or the like, and can be formed at low cost.

Further, because the boundary 120A between the adjacent electrodes 120 of the plurality of electrodes 120 is linear in a plan view, the capacitor formed between the driving electrode 120Tx and the detecting electrode 120Rx can be made into a simple shape, and the fabrication is easy.

Further, the MCU 160 switches the combination of the electrodes 120 selected as the driving electrode 120Tx and the detecting electrode 120Rx multiple times so that each of the plurality of electrodes 120 is selected as the detecting electrode 120Rx at least once. By selecting each of the plurality of electrodes 120 as the detecting electrode 120Rx at least once, each electrode 120 is surely selected as the detecting electrode 120Rx, and the detection accuracy of the pressing operation can be improved.

The plurality of electrodes 120 have a plurality of boundaries 120A between the adjacent electrodes 120, and the MCU 160 switches the combination of the electrodes 120 selected as the driving electrode 120Tx and the detecting electrode 120Rx multiple times so that each of the boundaries 120A is located between the driving electrode 120Tx and the detecting electrode 120Rx at least once. All of the boundaries 120A between the adjacent electrodes 120 become the boundary 120B between the driving electrode 120Tx and the detecting electrode 120Rx, and the capacitance of the detecting electrode 120Rx is detected by using all of the boundaries 120A as the boundary 120B. Therefore, the output of the detecting electrode 120Rx is equalized regardless of the position of the pressing operation, and the detection accuracy of the pressing operation can be improved.

When the skin 104 and the floating electrode 110 are made of a transparent material, the skin 104 can be illuminated by providing a light source on the upper surface of the substrate 101, for example. Further, a decorative layer can be provided on the lower surface side of the skin 104.

Further, because the foamed layer 102 is thicker than the skin 104, the foamed layer 102 can bend smoothly in response to the pressing operation, and because the distance between the floating electrode 110 and the electrode 120 can be properly secured, the detection accuracy of the pressing operation can be improved.

The plurality of electrodes 120 are divided equally into N (N is an integer of 3 or more) in a plan view. By using the plurality of electrodes 120 having the shape divided equally into N, the operation position with respect to the operation surface 104A can be properly detected.

The output detection method in the input apparatus is performed at the input apparatus including the skin 104 having the operation surface 104A; the first electrode (the floating electrode 110) arranged on the back side of the operation surface 104A; the plurality of electrodes 120 arranged facing the first electrode (the floating electrode 110); the foamed layer 102 arranged between the skin 104 and the plurality of electrodes 120; and the MCU 160 connected to the plurality of electrodes 120, wherein the skin 104 and the foamed layer 102 are elastically deformable by the pressing operation with respect to the operation surface 104A by the fingertip FT; the MCU 160 selects at least one electrode 120 as the driving electrode 120Tx from the plurality of electrodes 120; selects, as the detecting electrode 120Rx from the plurality of electrodes 120, at least one electrode 120 adjacent to the electrode 120 selected as the driving electrode 120Tx; switches the combination of the electrodes 120 selected as the driving electrode 120Tx and detecting electrode 120Rx from among the plurality of electrodes 120; and detects the output of the detecting electrode 120Rx in the plurality of combinations.

Therefore, by detecting the output of the detecting electrode 120Rx in a plurality of combinations of the electrodes 120 selected as the driving electrode 120Tx and the detecting electrode 120Rx, the output of the detecting electrode 120Rx is equalized regardless of the position of the pressing operation with respect to the first electrode (the floating electrode 110), the driving electrode 120Tx, and the detecting electrode 120Rx.

Therefore, it is possible to provide an output detection method in an input apparatus capable of detecting the operation amount of the pressing operation with high accuracy.

First Modified Example

Figure 5A:
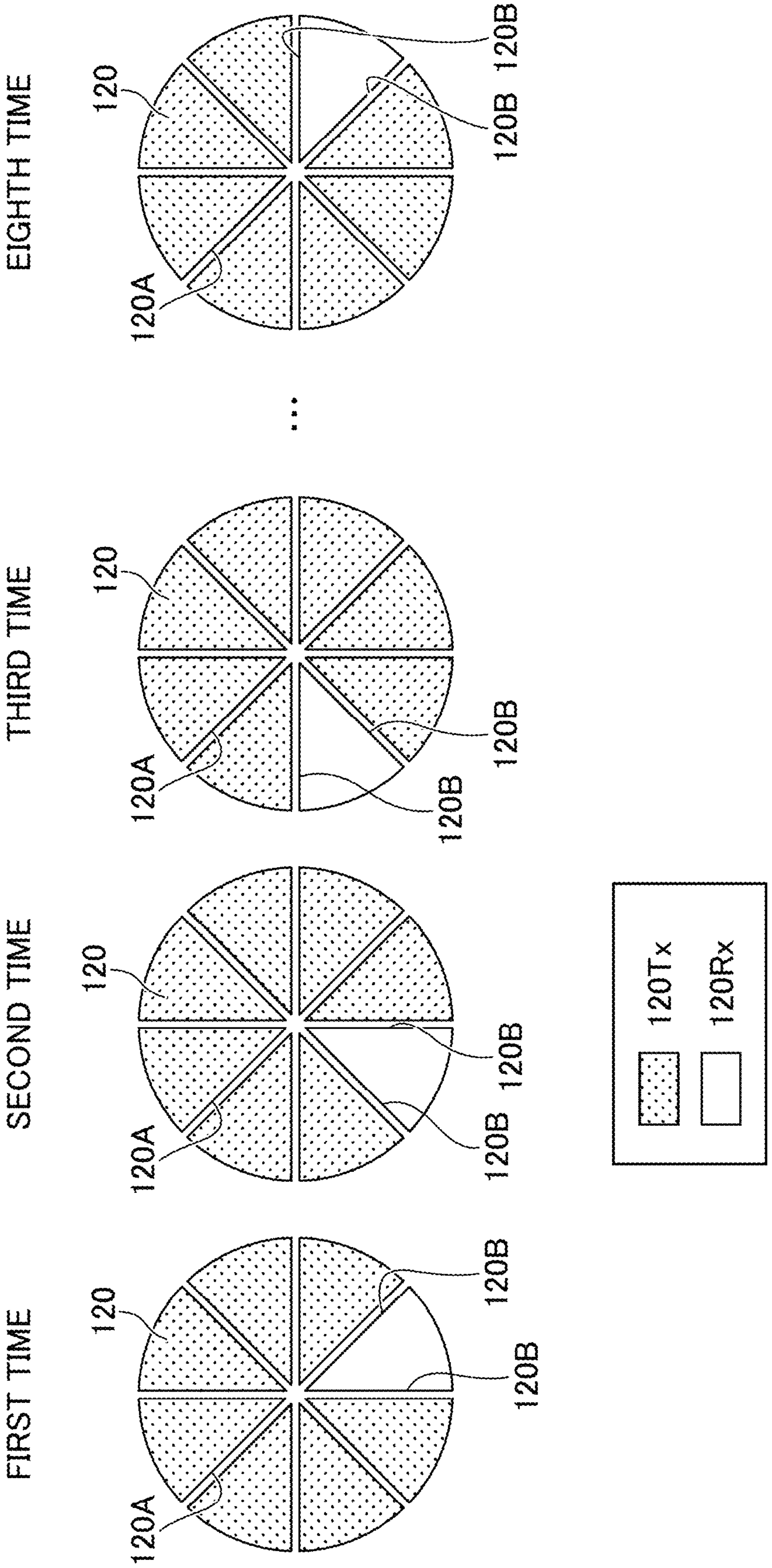
FIG. 5A is a diagram illustrating an example of a combination of selections of a driving electrode and a detecting electrode according to a first modified example of the embodiment.

FIG. 5A illustrates an example of the selection combination of the driving electrode 120Tx and the detecting electrode 120Rx according to the first modified example of the embodiment. FIG. 5A illustrates an example of the combinations of selections of the driving electrode 120Tx and the detecting electrode 120Rx which are switched over 8 times as in FIG. 3C.

FIG. 5A illustrates 8 electrodes 120 in which an electrode having an overall circular shape is divided into 8 equal parts as in FIG. 3C. In the first modified example, one of the eight electrodes 120 is selected as the driving electrode 120Tx and the remaining seven are selected as the detecting electrode 120Rx. In this case, the detecting electrode 120Rx connected to the detection unit 150 via the multiplexer 140 may be all seven detecting electrodes 120Rx, or one or two detecting electrodes 120Rx adjacent to one electrode 120 acting as the driving electrode 120Tx.

By shifting the driving electrodes 120Tx one by one for eight times, as illustrated in FIG. 5A, the combination of the electrodes 120 selected as the driving electrode 120Tx and the detecting electrode 120Rx is switched a plurality of times so that each of the eight electrodes 120 is selected as the detecting electrode 120Rx at least once. Also, the combination of the electrodes 120 selected as the driving electrode 120Tx and the detecting electrode 120Rx is switched a plurality of times so that each of the eight boundaries 120A is located between the driving electrode 120Tx and the detecting electrode 120Rx at least once. Therefore, it is possible to provide an input apparatus 100 capable of detecting the operation amount of the pressing operation with high accuracy.

Second Modified Example

Figure 5B:
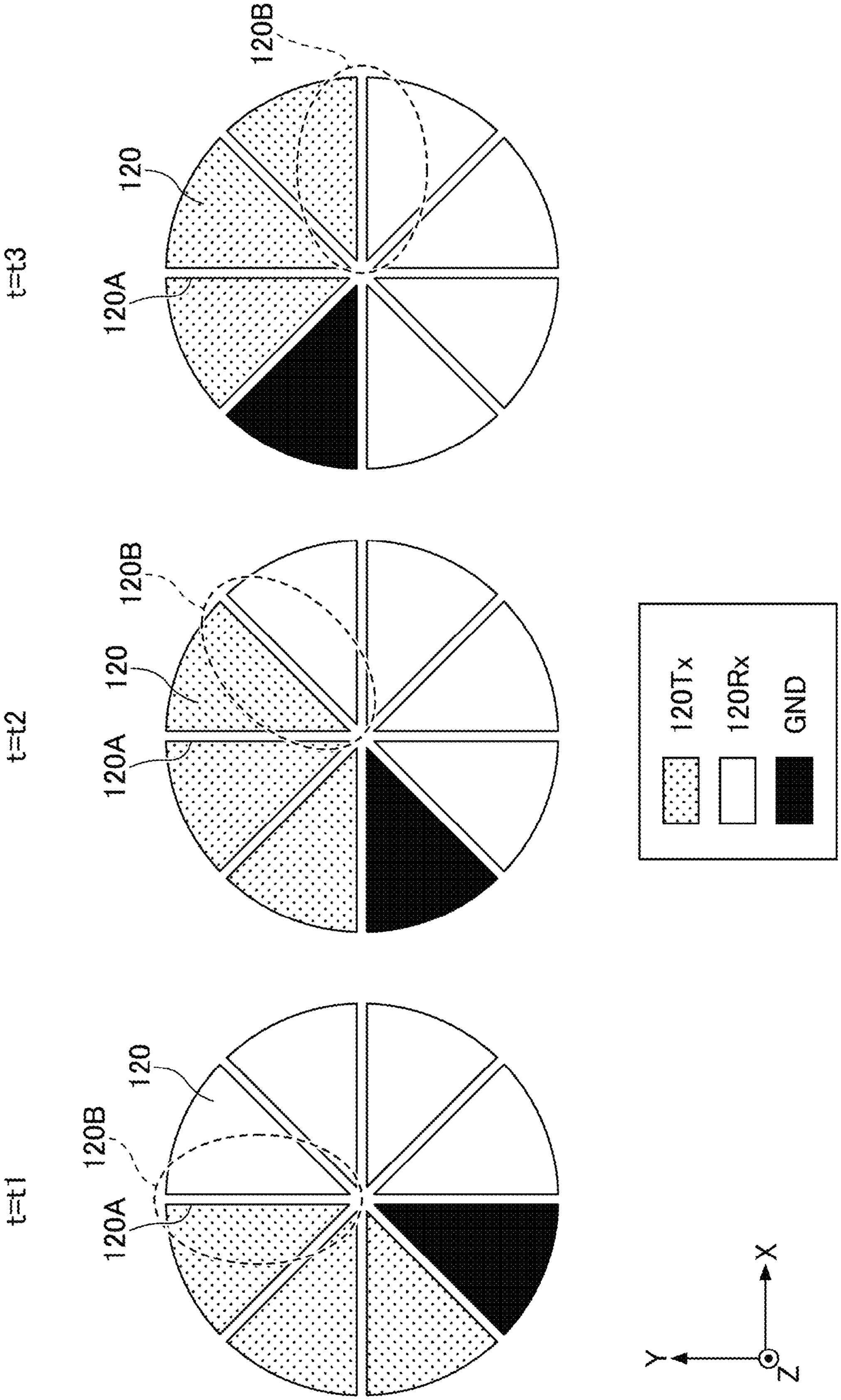
FIG. 5B is a diagram illustrating an example of a combination of selections of a driving electrode and a detecting electrode according to a second modified example of the embodiment.

FIG. 5B illustrates an example of the combination of selecting the driving electrode 120Tx and the detecting electrode 120Rx according to the second modified example of the embodiment. FIG. 5B illustrates eight electrodes 120 obtained by dividing an electrode having a circular shape as a whole into eight equal parts, similar to FIG. 3B.

FIG. 5B illustrates an example of the selection combinations at times t1, t2, and t3. In FIG. 5B, the electrode 120 selected as the driving electrode 120Tx is indicated by dots, and the electrode 120 selected as the detecting electrode 120Rx is indicated by a blank. The electrode 120 maintained at the ground potential is indicated in black. In FIG. 5B, the substrate 101 is omitted.

In this manner, the electrode 120 that is not selected as the driving electrode 120Tx or the detecting electrode 120Rx may be used as the ground electrode. Because the driving electrode 120Tx and the detecting electrode 120Rx located on respective sides of the ground electrode, are far apart from each other, and the detecting electrode 120Rx does not provide a sufficient capacitance Crt (see FIG. 1), the boundary 120B where the capacitance Crt is detected by the detection unit 150 is a portion where the driving electrode 120Tx and the detecting electrode 120Rx are adjacent to each other.

The electrode 120 that is not selected as the driving electrode 120Tx or the detecting electrode 120Rx may be maintained at a predetermined potential (constant potential), not limited to the ground potential (0 V). The operation is stabilized by the presence of the electrode 120 having a constant potential.

Third Modified Example

Figure 6A:
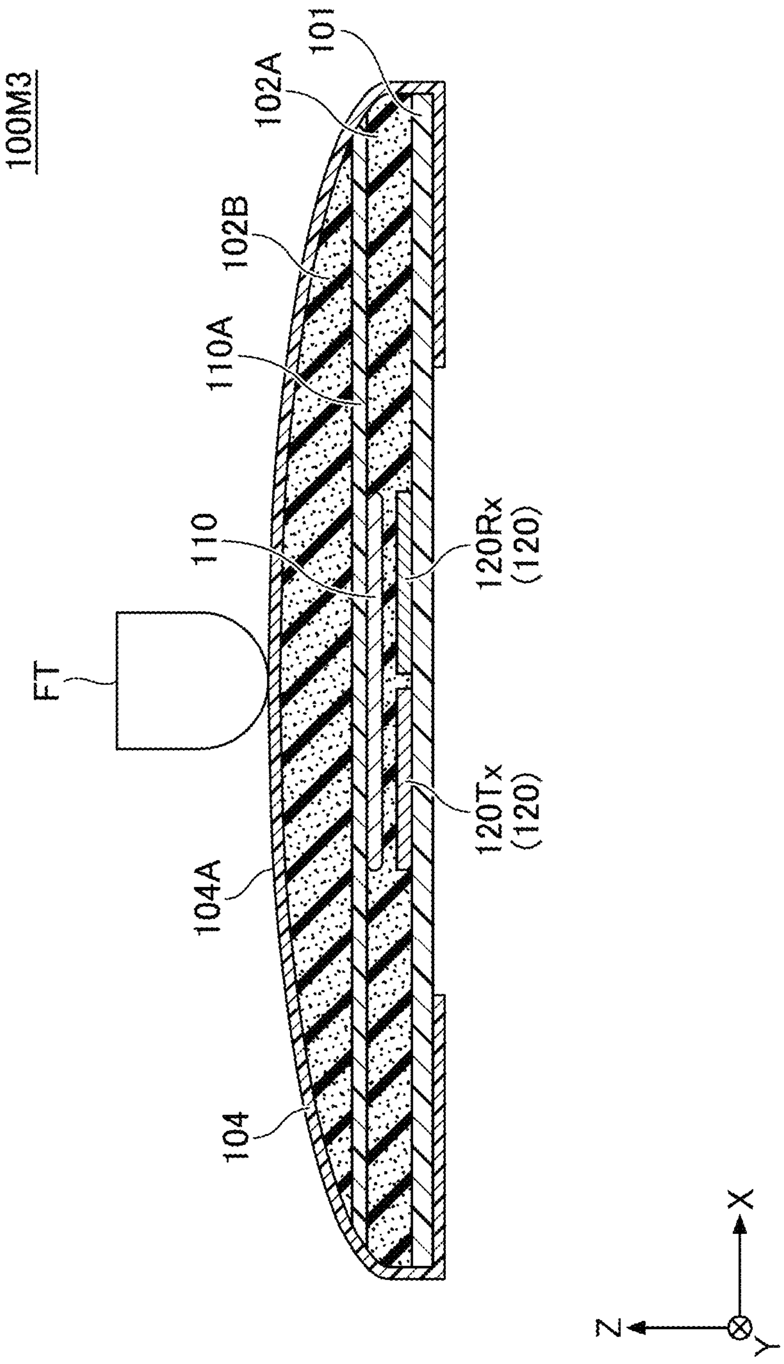
FIG. 6A is a cross-sectional view illustrating an example of a configuration of an input apparatus according to a third modified example of the embodiment.

FIG. 6A is a cross-sectional view illustrating an example of the configuration of an input apparatus 100M3 according to the third modified example of the embodiment.

The input apparatus 100M3 has two foamed layers 102A and 102B. The foamed layer 102A is an example of an elastic member and an example of a first elastic member. The foamed layer 102B is an example of a second elastic member.

The foamed layer 102A is formed by dividing the foamed layer 102 of the input apparatus 100 illustrated in FIG. 1 into two layers. In the input apparatus 100M3, the floating electrode 110 is provided on the lower surface of a sheet 110A provided between the foamed layers 102A and 102B. The sheet 110A may be made of an elastically deformable resin or the like, and as an example, a sheet made of polyimide may be used. In this case, as an example, the floating electrode 110 can be formed on the lower surface of the sheet 110A made of polyimide by vapor deposition, printing, or the like.

In the input apparatus 100M3, because the distance between the floating electrode 110 and the fingertip FT is longer than in the input apparatus 100 illustrated in FIG. 1, the capacitance Cfg (see FIG. 1) between the floating electrode 110 and the fingertip FT is reduced, and the variation of the output of the detecting electrode 120Rx according to the position where the pressing operation is performed on the operation surface 104A, is more reduced, and the operation amount of the pressing operation can be detected with high accuracy.

Further, in the input apparatus 100M3, because the foamed layer 102B exists directly under the skin 104 as compared with the input apparatus 100 illustrated in FIG. 1, the feeling when the pressing operation is performed with the fingertip FT is improved.

<Simulation Result of Modified Example 3>

Figure 6B:
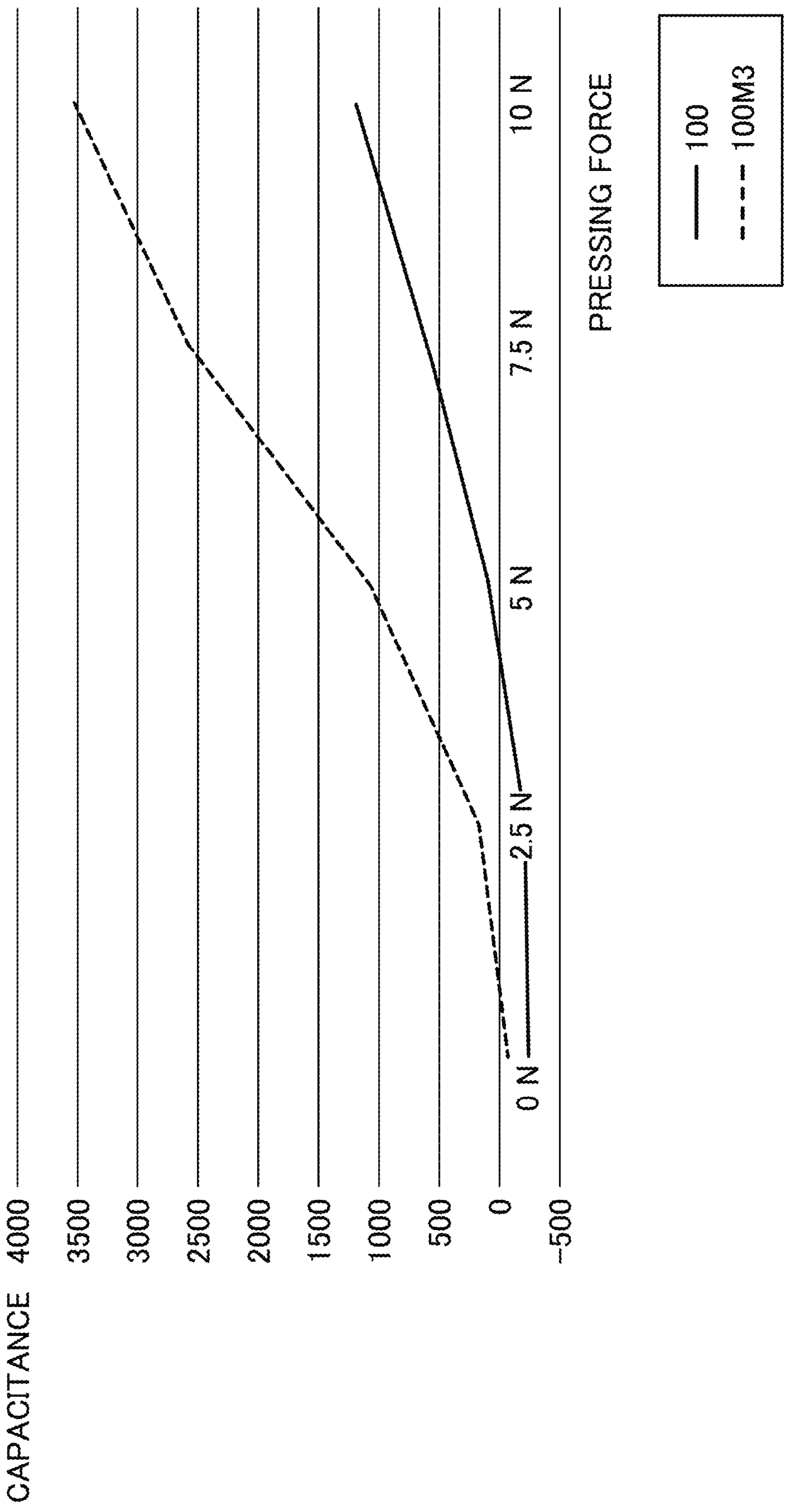
FIG. 6B is a diagram illustrating an example of a relationship between a pressing force and a capacitance detected by a detection unit when a pressing operation is performed at the input apparatus according to the third modified example of the embodiment.

FIG. 6B is a diagram illustrating an example of the relationship between the pressing force and the capacitance detected by the detection unit 150 when the pressing operation is performed at the input apparatuses 100 and 100M3. In the simulation, as illustrated in FIG. 3A, four of the driving electrodes 120Tx and four of the detecting electrodes 120Rx were selected from the eight electrodes 120, and as illustrated in FIG. 3B, the electrodes 120 were shifted one by one, and the boundary 120B was rotated at least once, thereby calculating the capacitance detected by the detection unit 150.

In FIG. 6B, the horizontal axis indicates the pressing force (N). 0 N on the horizontal axis indicates the position where the pressing force is zero, and represents the state where the fingertip FT touches the operation surface 104A (the state where the touching operation is performed). The vertical axis indicates the capacitance detected by the detection unit 150 as a count value (without units). Further, the characteristic of the pressing operation at the input apparatus 100 is illustrated by a solid line, and the characteristic of the pressing operation at the input apparatus 100M3 is illustrated by a dashed line.

As illustrated in FIG. 6B, the capacitance of the pressing operation at the input apparatus 100M3 (dashed line) was larger than that of the pressing operation at the input apparatus 100 (solid line). As illustrated in FIG. 6A, it was confirmed that the detection sensitivity for the pressing operation increased by providing the floating electrode 110 between the two foamed layers 102A and 102B. This increase in the detection sensitivity was similar at both the center and the periphery of the operation surface 104A.

Fourth Modified Example

Figure 7A:
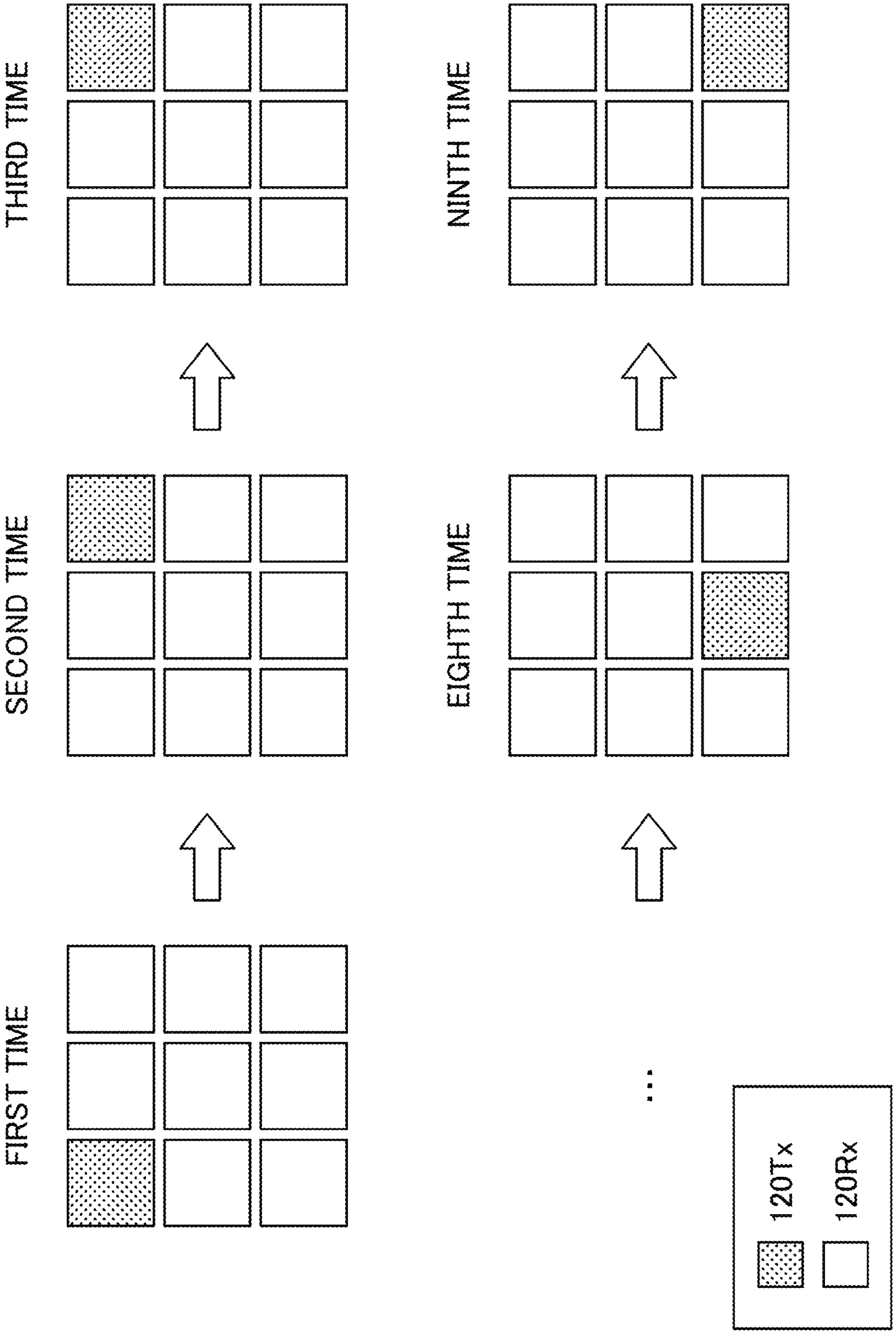
FIG. 7A illustrates an example of the combination of the driving electrode and the detecting electrode according to a fourth modified example of the embodiment.

FIG. 7A illustrates an example of the combination of selection of the driving electrode 120Tx and the detecting electrode 120Rx according to the fourth modified example of the embodiment. The electrode 120 in the fourth modified example has a configuration in which an electrode having an overall square shape is divided equally into nine parts into a lattice of three rows and three columns. Therefore, the shape of each electrode 120 is also square.

FIG. 7A illustrates an example of the combination of selection in the first to ninth measurements. In FIG. 7A, the electrode 120 selected as the driving electrode 120Tx is indicated by dots, and the electrode 120 selected as the detecting electrode 120Rx is indicated by a blank. In FIG. 7A, the substrate 101 is omitted.

Here, one of the nine electrodes 120 is selected as the driving electrode 120Tx and the remaining eight are selected as the detecting electrode 120Rx. Conversely, one of the nine electrodes 120 may be selected as the detecting electrode 120Rx and the remaining eight may be selected as the driving electrode 120Tx.

One driving electrode 120Tx is supplied with an AC driving voltage from the power supply 130 via the multiplexer 140. The eight detecting electrodes 120Rx are connected to the detection unit 150 via the multiplexer 140. Therefore, the detection unit 150 detects the capacitance of the eight detecting electrodes 120Rx. One or more electrodes 120 adjacent to or surrounding one driving electrode 120Tx may be selected as the detecting electrode 120Rx.

At least one of the nine electrodes 120 can be selected as the driving electrode 120Tx as illustrated in FIG. 7A by shifting the driving electrodes 120Tx one by one in the first to ninth measurements.

As illustrated in FIG. 7A, the configuration in which the square electrodes 120 are arranged is suitable for uniformly detecting a large area. Moreover, because the shape of the electrodes 120 is simple, there is an advantage that a plurality of electrodes 120 can be easily manufactured and wired.

Thus, by shifting the boundary 120B between the driving electrode 120Tx and the detecting electrode 120Rx in a time division manner, the detection sensitivity can be equalized across the nine electrodes 120. By equalizing the detection sensitivity across the nine electrodes 120, it is possible to detect the operation amount of the pressing operation with high accuracy.

Figure 7B:
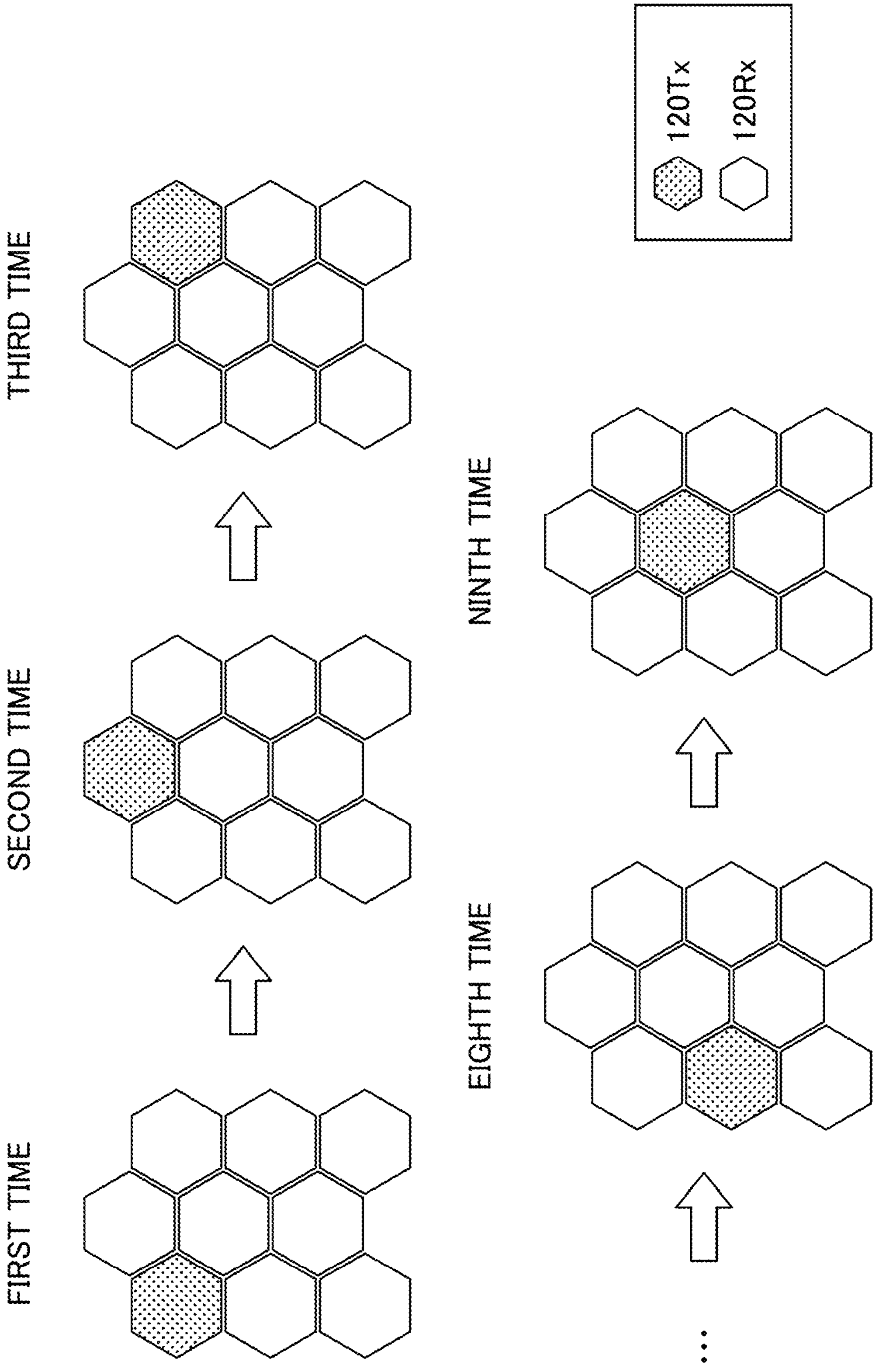
FIG. 7B illustrates an example of a configuration in which the electrode of the fourth modified example is further modified.

Moreover, the nine electrodes 120 illustrated in FIG. 7A may be modified as illustrated in FIG. 7B. FIG. 7B illustrates an example of a configuration in which the electrodes 120 of the fourth modified example are further modified. FIG. 7B has a configuration in which nine regular hexagonal electrodes 120 are arranged in three rows and three columns like a honeycomb structure. Each electrode 120 has the same shape and size. As illustrated in FIG. 7B, at least one of the nine electrodes 120 can be selected as the driving electrode 120Tx, as illustrated in FIG. 7B, by using a plurality of electrodes 120 arranged so as to form a honeycomb structure, for example, and shifting the driving electrode 120Tx one by one in the first to ninth measurements.

As illustrated in FIG. 7B, the configuration in which the regular hexagonal electrodes 120 are arranged is suitable for uniformly detecting a large area. Further, because the shape of the electrodes 120 is simple, the plurality of electrodes 120 can be easily manufactured and easily wired.

In the fourth modified example, the configuration in which the plurality of electrodes 120 are arranged in a lattice shape (FIG. 7A) or a honeycomb shape (FIG. 7B) has been described, but the arrangement is not limited to these, and may be arranged in an annular shape, for example. The shape, size, or overall arrangement of the plurality of electrodes 120 may be set within the range used for detecting the pressing operation according to the size and shape of the operation surface 104A. By optimizing the shape, size, or overall arrangement of the plurality of electrodes 120 in this way, the operation amount of the pressing operation can be appropriately and accurately detected.

An input apparatus capable of detecting the operation amount of a pressing operation with high accuracy, and an output detection method in the input apparatus, are provided.

Although the input apparatus of the exemplary embodiment of the present disclosure and the output detection method in the input apparatus have been described above, the present disclosure is not limited to the specifically disclosed embodiments, and various modifications and changes can be made without departing from the scope of the claims.

What is claimed is:

1. An input apparatus comprising:

a skin having an operation surface;

a first electrode arranged on a back side of the operation surface;

a second electrode arranged facing the first electrode, the second electrode including a plurality of divided electrode portions, each of the plurality of the divided electrode portions configured to selectively serve as a driving electrode or a detecting electrode;

an elastic member arranged between the skin and the plurality of second electrodes;

a processor connected to the second electrode; and a memory storing instructions, wherein the skin and the elastic member are elastically deformable by a pressing operation performed on the operation surface by an operation body, and the instructions, when executed, cause the processor to execute:

selecting at least one divided electrode portion from among the plurality of divided electrode portions as the driving electrode, selecting at least one divided electrode portion adjacent to the divided electrode portion selected as the driving electrode, from among the plurality of divided electrode portions, as the detecting electrode, switching a combination of the divided electrode portions selected as the driving electrode and the detecting electrode, and detecting an output of the detecting electrode in a plurality of the combinations.

2. The input apparatus according to claim 1, wherein the first electrode is a floating electrode.

3. The input apparatus according to claim 1, wherein a boundary between adjacent divided electrode portions among the plurality of divided electrode portions is linear in a plan view.

4. The input apparatus according to claim 1, wherein the instructions, when executed, cause the processor to execute switching the combination of the divided electrode portions selected as the driving electrode and the detecting electrode multiple times such that each of the plurality of divided electrode portions is selected as the detecting electrode at least once.

5. The input apparatus according to claim 4, wherein the plurality of divided electrode portions have a plurality of boundaries between adjacent divided electrode portions, and the instructions, when executed, cause the processor to execute switching the combination of the divided electrode portions selected as the driving electrode and the detecting electrode multiple times such that each of the plurality of boundaries is located between the driving electrode and the detecting electrode at least once.

6. The input apparatus according to claim 4, wherein the instructions, when executed, cause the processor to execute maintaining at least one divided electrode portion among the plurality of divided electrode portions that is not selected as the driving electrode or the detecting electrode, at a constant potential.

7. The input apparatus according to claim 1, wherein the skin and the first electrode are formed of a transparent material.

8. The input apparatus according to claim 1, wherein the elastic member is thicker than the skin.

9. The input apparatus according to claim 1, wherein the plurality of divided electrode portions are arranged in an annular, lattice, or honeycomb shape in a plan view.

10. The input apparatus according to claim 9, wherein the plurality of divided electrode portions are equally divided into N portions (N is an integer of 3 or more) in a plan view.

11. An output detection method in an input apparatus, the input apparatus including:

a skin having an operation surface;

a first electrode arranged on a back side of the operation surface;

a second electrode arranged facing the first electrode, the second electrode including a plurality of divided electrodes portions, each of the plurality of the divided electrode portions configured to selectively serve as a driving electrode or a detecting electrode;

an elastic member arranged between the skin and the plurality of second electrodes;

a processor connected to the second electrode; and a memory storing instructions, when executed, cause the processor to execute the output detection method, wherein the skin and the elastic member are elastically deformable by a pressing operation performed on the operation surface by an operation body, the output detection method comprising:

selecting at least one divided electrode portion from among the plurality of divided electrode portions as the driving electrode, selecting at least one divided electrode portions adjacent to the divided electrode portion selected as the driving electrode, from among the plurality of divided electrode portions, as the detecting electrode, switching a combination of the divided electrode portions selected as the driving electrode and the detecting electrode, and detecting an output of the detecting electrode in a plurality of the combinations.

* * * * *